United States Patent [19]

Van Herk et al.

[11] 4,352,131
[45] Sep. 28, 1982

[54] MEMORY DISC ADDRESSING DEVICE

[75] Inventors: Alfred Van Herk, Eindhoven; Jacob A. M. Buis, The Hague; Jan H. Klijnstra, The Hague; Jan Van Staalduinen, The Hague, all of Netherlands

[73] Assignee: U.S. Philips Corporation, New York, N.Y.

[21] Appl. No.: 126,077

[22] Filed: Feb. 29, 1980

[51] Int. Cl.³ .................. G11B 21/08; G11B 21/10
[52] U.S. Cl. ........................................ 360/78; 360/77
[58] Field of Search ........................... 360/78, 77, 75

[56] References Cited
U.S. PATENT DOCUMENTS

| | | | |
|---|---|---|---|
| 3,812,533 | 5/1974 | Kimura et al. | 360/77 |
| 3,838,457 | 9/1974 | Palmer | 360/78 |
| 4,006,394 | 2/1977 | Cuda | 360/78 |
| 4,188,646 | 2/1980 | Sordello et al. | 360/77 |
| 4,208,679 | 6/1980 | Hertrich | 360/77 |

Primary Examiner—Alfred H. Eddleman
Attorney, Agent, or Firm—James J. Cannon, Jr.

[57] ABSTRACT

A device for determining a complete track number of a track which forms part of a set of tracks on a disc-shaped record carrier, enabling direct control by means signals detected from servo sectors during each phase of positioning, and making a calculated estimate of a new track number on the basis of the displacement speed of the positioning member. The device reads a first track number in the group and estimates a second group number. It then estimates a complete track number on the basis of the displacement speed of positioning member body, determining the difference between the complete track number read and the estimated complete track number and comparing the magnitude of the difference obtained with a value determined by half a signal being produced if said magnitude is smaller than half, said signal validating the complete track number present in the first determination. A complete track number is determined by the sequential use of said estimates after each servo sector. Various embodiments of the circuits used for estimating a track number in this process are presented.

8 Claims, 9 Drawing Figures

MEMORY DISC ADDRESSING DEVICE

BACKGROUND OF THE INVENTION

The invention relates to a device for determining a complete track number or address(s) of a track which forms part of a set of tracks present on a disc-shaped record carrier, said set consisting of (n) groups of ($s_g$) tracks, the record carrier being divided into alternating sectors with groups of data tracks and sectors with groups of servo tracks, each track having per group of servo tracks its own identification code which includes a number of the track within the group and which can be read by a transducer device provided on a positioning member.

A device of this kind is used in disc memories in which one or more discs provided with or made of a storage material (for example, magnetic, optical, ceramic) are used for the writing, storage and reading of data. An important component of such a disc memory is formed by the positioner, i.e. the movable support of the write and/or read transducer (for example, a magnetic head) which is to be accurately positioned over a desired track of the disc as quickly as possible.

Many versions of disc memories are known. A disc memory comprising a device for determining a number of a track of the kind described is known from U.S. Pat. No. 3,812,533. In this disc memory, the radial position of the write/read transducer is controlled by utilizing the servo signals incorporated in a limited number of narrow sectors on each disc. It is thus possible to determine a track number of each track within group of tracks on the disc (so called "coarse" positioning) and, moreover, to realize the accurate positioning over a given track of a group (so-called "fine" positioning). The determination of the track number per group, however, is not sufficient. It must be possible to distinguish each track from all other tracks. The combination of the number of the group of which a track forms part, and the track number within a group form an unambiguous data for the complete address number of the relevant track. Complete positioning of the positioner over a track can be achieved only on this basis. In order to make this possible in the described disc memories without widening the servo sectors (i.e. without loss of effective data storage capacity), there is provided a separate optical position transducer which controls at least the positioning between respective groups of tracks. This separate transducer makes the solution of the positioning problem expensive and requires special structural steps to ensure proper and reliable operation.

SUMMARY OF THE INVENTION

An object of the invention is to enable direct control by means of the signal detected from the servo sectors during each phase of the positioning, using servo signals which are recorded in a limited number of (narrow) servo sectors on each disc, without these servo sectors being enlarged.

In order to achieve this object, the invention provides a first means for forming a complete track number composed of firstly the track number read in a group and secondly a trial group number which is formed in second means and which is variable in an increasing or decreasing sense, third means for determining the difference between a complete track number formed in the first means and a complete track number estimated in fourth means on the basis of the displacement speed of the positioning member body, fifth means for comparing the magnitude of the difference obtained in the third means with a value determined by half ($S_g$), a signal being produced if said magnitude is smaller than half ($S_g$), said signal validating the complete track number present in the first means at the relevant instant.

This set-up of the device enables the correct track number to be determined after each servo sector by utilizing the calculated estimate of the new track number. Hereinafter, it will be demonstrated that a comparatively inaccurate estimate can suffice for determination of the correct complete track number. A separate position transducer can thus be dispensed with. The calculation of said estimate can be performed in various ways. When the system incorporating the device in accordance with the present invention includes a speed transducer, the speed signal can always be integrated with respect to time to generate a position signal which is an estimate of the track number reached. In order to achieve this, an embodiment of the device may comprise fourth means for estimating a complete track number which consist of an integrator, an analog-to-digital converter, and an adder, and in which a speed signal determined by the positioning member is applied to the integrator, the output thereof being connected, via the analog-to-digital converter, to an input of the adder, a further input of the adder receiving the value of the preceding complete track number, so that the estimated value of a next complete track number appears on the output of the adder.

Thus, an analog-to-digital converter is required for obtaining the result in binary form for further processing. A further embodiment of the device in accordance with the invention offers an alternative solution in that the fourth means for estimating a complete track number consist of a voltage-frequency converter, a counter and an adder, a speed signal which is determined by the positioning member being digitized in the converter and being counted in the counter, after which the counting result and the value of the preceding complete track number are applied to inputs of the adder, so that the estimated value of a next complete track number appears on the output thereof, A further possibility which may be sufficiently accurate and may be attractive because of its simplicity consists in estimating the complete track number $s=s(t_2)$ by a linear extrapolation between track numbers determined during previous measurements i.e. between the last number $s(t_1)$, and the last but one, $s(t_0)$. In order to utilize this aspect, a further embodiment of the device in accordance with the invention may comprise fourth means consisting of a subtractor in which, after the doubling of the value of the latest (last determined) complete track number, the doubled value is reduced by the value of the preceding complete track number.

The advent of large scale integrated circuits is accompanied by the aim to utilize their features in many applications. A frequently used integrated circuit for general use, known as a microprocessor, can also be used for realizing the device in accordance with the invention. A plurality of "peripheral" circuits in the form of memories (ROM, RAM), input/output circuits etc. can then be accommodated on the same chip. Microcomputer is a frequently used term in this respect. For the principle of the invention it is not important per se how the data processing capacity of the circuits—integrated or not—is composed, the important aspect being that use is made of this data processing capacity. In order to indicate this, the general term programmed digital signal processor is used hereinafter.

A preferred embodiment of the device in accordance with the invention comprises a programmed digital signal processor which comprises said first, second, third, fourth and fifth means in the form of register function means and arithmetic logic function means which act as counting/adding function means, subtraction function means and comparison function means.

In order to obtain even more certainty as regards the estimate, the flexibility of a programmed digital signal processor offers extrapolation using a plurality of previously found complete track numbers (and notably the difference therebetween). In order to achieve this, the fourth means which are included in the programmed digital signal processor for determining the estimate of a complete track number are adapted to extrapolate over the latest (last determined) complete track number and one or more preceding complete track numbers. The fourth means incorporated in the programmed digital signal processor for determining the estimate of a complete track number may be adapted to find s' (estimated track number) on the basis of the relationship $$s = \frac{s(t_1) - s(t_0) + dss(t_0)}{2} + s(t_1)$$

in which $s(t_1)$ is the latest (last determined) complete track number, $s(t_0)$ is the preceding complete track number, and $dss(t_0)$ is the difference between the preceding complete track number and the preceding complete track number but one. Normally speaking, the programmed digital signal processor will also be adapted to determine the difference between a desired target track number and a complete track number reached.

A further explanation and embodiments of the device in accordance with the invention will be described, by way of example, hereinafter with reference to the accompanying Figures. Notably the use in a magnetic disc-memory is shown. However, it is to be noted that the invention is by no means restricted to the examples given.

DESCRIPTION OF THE PREFERRED EMBODIMENT

Figure 1:
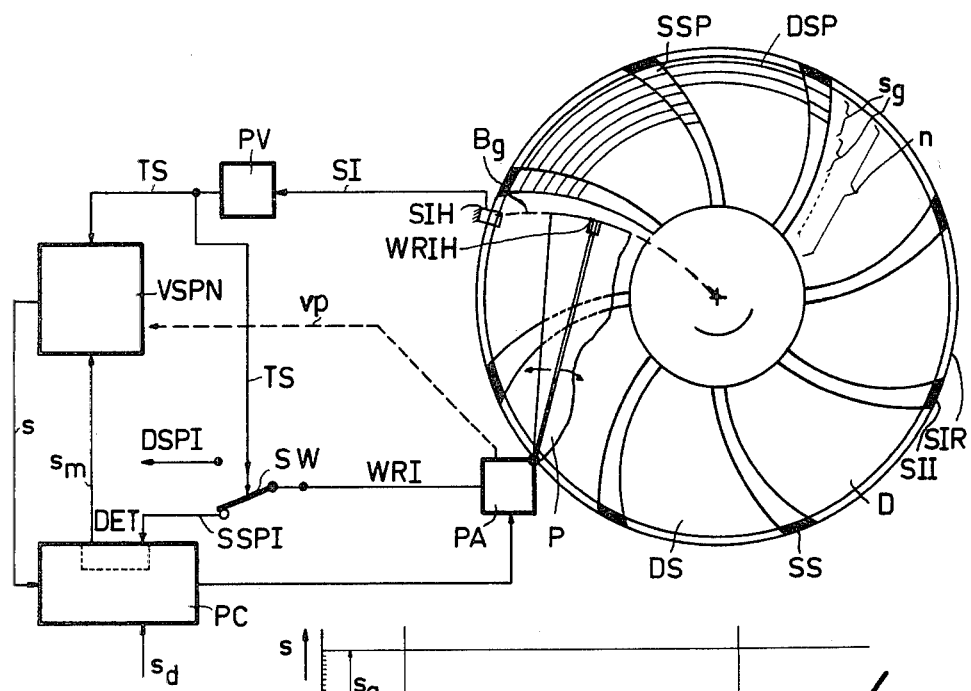
FIG. 1 shows a disc-memory system comprising a device in accordance with the invention.

FIG. 1 shows how a device in accordance with the invention can be included in a disc memory system.

FIG. 1 and the accompanying description serve to provide a better insight into the nature of the environment in which the device in accordance with the invention can be used. However, it is intended merely as an example of such an environment; it is to be noted that other embodiments of disc-memory systems can utilize the invention equally advantageously.

The letters VSPN in FIG. 1 denote the device in which a complete track number s is determined in accordance with the invention. D denotes a disc of the memory system which may comprise one or more device which may be removable from the memory system. Disc D is provided with tracks in which SSP are the servo tracks which are situated in servo sectors SS distributed over the disc and DSP are data tracks which are situated in so-called data sectors DS. The servo sectors contain data SSPI which, by using the device VSPN, is sufficient to provide complete positioning of the positioning body or positioner denoted by the letter P. The data sectors contain the user data DSPI stored in the memory system. Said data SSPI of the servo sectors generally (cf. U.S. Pat. No. 3,812,533) consists of at least two components which are contained in the servo sectors in combined form or not. The first component is the track number data of the tracks $s_m$ in each group of $s_g$ tracks (there are n groups, so $N = n \times s_g$ tracks in total) and the second component is the fine-positioning data which enables accurate positioning of the positioner over a given track. In this respect, reference is made to disc memory systems comprising such servo sectors which are described in said U.S. Pat. No. 3,812,533; U.S. Pat. No. 4,027,338; U.S. Pat. No. 4,136,265; and U.S. Pat. No. 4,163,265; corresponding to Netherlands Patent Application No. 7,702,570 in the name of the same assignee.

The positioner P is shown, by way of example, as a rotatable body which can describe an arc $B_g$ across the disc D. All tracks of the disc can thus be covered by the read/write transducer WRIH. (A positioner of this kind is disclosed in British Patent No. 1,342,495).

Because of the rotatable arrangement of P, the sectors shown on the disc D are arc-shaped in order to provide a parallel relationship between said arc $B_g$ and the sectors. Thus, there is no difference between signals written and read by the transducer WRIH when this arrangement is compared with the more generally used arrangement comprising a positioner which is arranged on a carriage and which moves radially across the disc.

It is to be noted that, without extensive modifications being required, the device in accordance with the invention can also be used in disc memory systems which do not use concentric tracks but helical tracks.

Positioners are displaced and positioned over a desired track in known manner by a positioning apparatus PA which is controlled by a positioning control device PC. The transducer SIH serves to supply fixed "clock" data and SI is the data concerning the subdivision of the disc D into sectors DS and SS. To this end, in this example a sector ring SIR is shown at the outer circumference of the disc D. This ring SIR comprises the parts SII which indicate the location of the servo sectors on the disc. The data SI is processed to form a signal TS in a pulse-shaping network PV in known manner. The signal TS consists of pulses having a length which equals the time during which a part SII of SI is detected by SIH. Via the selected location (on arc $B_g$), the pulses TS indicate when and for how long a servo sector passes the transducer WRIH. The signal WRI is then read and applied to a switching device SW. During the pulse signal TS, SW is in the lower position in the drawing and ensures that WRI, then specifically containing the servo sector data SSPI, is applied to the positioning control device PC. Outside the pulses TS, switch SW is in the upper position and the data WRI, then specifically containing the user data DSPI, is applied to the user device (for example, a computer) which is not shown. The control device PC may be a known control device (compare the embodiments in the Patent Specifications cited above). The most important signals applied to PC area: $s_d$ which is the target track on which positioning must take place as requested by the user device (for example, a computer), and (b) SSPI which is the servo sector data wherefrom, in a part DET of PC, in the first instance the track number $s_m$ of a servo track passing the transducer WRIH at that instant is derived. This data $s_m$ is applied to the device VSPN for determining the complete track number. The pulse signal TS is also applied to the device VSPN. Depending on the construction of VSPN, the complete track number s is determined, with or without use of the signal vp which indicates the speed of displacement of the positioner P and which is generated in PA in this embodiment. The data s, $s_d$ and the servo signal data SSPI can be used to generate unambiguous control signals (for coarse as well as fine positioning) for the positioning apparatus PA and hence for the positioner P.

Figure 2:
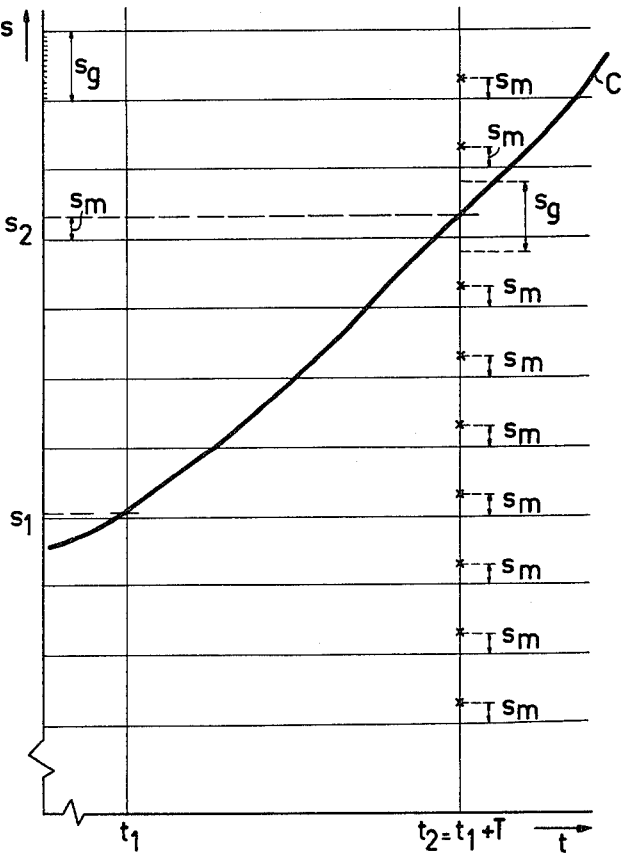
FIG. 2 shows a curve of the displacement of a transducer between two servo sectors at instants $t_1$ and $t_2$.

FIG. 2 shows a curve C which represents the path actually followed by a write/read transducer across a memory disc between the passage of two servo sectors at sampling instants $t = t_1$ and $t = t_2 = t_1 + T$. At the starting instant $t_1$, the complete track number $s = s_1$ is known. At $t_2 = t_1 + T$, the track number $s_m$ of the track reached is measured only on the basis of the code content of the servo track. The group number is unknown. This means that the transducer could be present in any of the points of FIG. 2 denoted by a cross. Because the speed of the positioner is limited, the maximum number of groups which can be passed from the previous position is also limited. This maximum number of groups is m, for which:

$$m \geq \frac{v_m}{s_g f S a} \geq m - 1;$$

therein, $v_m$ is the maximum speed of the positioner in meters/second, $s_g$ is the number of tracks per group, f is the revolution frequency of the memory disc in Hz, S is the total number of servo sectors, and a is the centre-to-centre distance between two tracks in meters. It is to be noted that said pulse T has a recurrence time equal to 1/f.S. Thus, after a time T the transducer position may be in any one of M successive groups of tracks. If the direction of movement of the transdicer is not known in advance, the number of feasible positions is twice as high, so 2 m. According to the idea of the invention, the correct position of the transducer can still be unambiguously determined, i.e. the new complete track number $s_2$. To this end, the position of the transducer at the instant $t_1 + T$ is estimated. The error in this estimate must not be greater than the range of $s_g$ tracks around the actual value, see FIG. 2. Therefore, the maximum absolute error in the estimate may not exceed $\frac{1}{2}s_g$. In this respect, see the description given with reference to FIG. 3.

Figure 3:
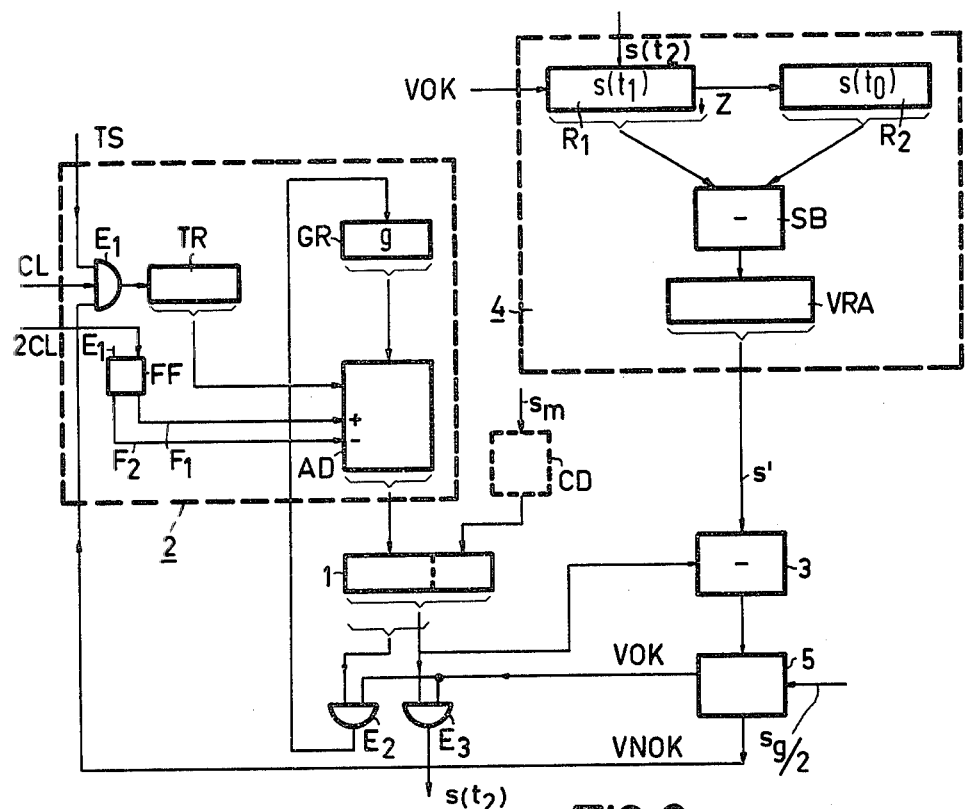
FIG. 3 shows an embodiment of a device in accordance with the invention.

FIG. 3 shows a diagram of an embodiment of a device in accordance with the invention. The reference numeral 1 denotes the first means for forming a complete track number. In this embodiment, these first means consist of a register. The reference numeral 2 denotes the second means for supplying a group number which varies in an increasing or decreasing sense. These second means in this embodiment consist of an AND-function gate $E_1$ and flipflop FF, a counter TR, an adder AD and a group number register GR. The reference numeral 3 denotes the third means for determining the difference between a complete track number formed in the register 1 and 2 complete track number estimated in the fourth means which are denoted by the reference 4. In this embodiment, 3 is shown to be a subtractor. The fourth means 4 in this embodiment provide the above estimate on the basis of a linear extrapolation of previously obtained complete track numbers. These fourth means 4 comprise: a subtractor SB and three registers $R_1$, $R_2$ and VRA. The reference numeral 5 denotes the fifth means, which in this embodiment is a comparison device in which the magnitude of the difference determined in 3 is compared with the value $s_g$. Also shown is CD which is a code converter which, if necessary, converts the track number $s_m$ read from a group into a preferably binary code. This track number as read may be expressed, for example, in the so-called Gray code. This Gray code is a suitable code for incorporating track numbers in servo tracks. Also shown are two AND-function gates $E_2$ and $E_3$. The result of the comparison in 5 of the magnitude of the result of 3 may be that it is larger than $s_g/2$; this results in a 1-signal on line VNOK, which indicates that the correct complete track number is not yet present in register 1. If said result is smaller than $s_g/2$, a 1-signal is supplied on line VOK, which indicates that the correct complete track number $s(t_2)$ is present in the register 1. The comparison device 5 may be a simple subtractor in which it is checked whether the subtraction result is positive or negative.

The further operation of the device shown in FIG. 3 is as follows. When the pulse TS appears (see FIG. 1), a clock signal CL can reach the counter TR, via gate E1, if the line VNOK also carries a 1-signal. TR successively passes through the positions 0, 1, 2, ... m, assuming it starts from the position 0. Therein, m is the said maximum number of groups which can be traversed from a preceding position. (The starting position "0" or an other value chosen as a starting position can be adjusted, for example, each time at the first clock pulse passed by E1). The successive counting positions are applied from TR to the adder AD. From the group number register GR, the group number "g" present therein is also applied to AD. AD is controlled on further inputs "+" and "−": a clock signal 2CL (double the pulse frequency of CL) is applied to the flipflop FF. The E-input of this FF always carries a 1-signal. In reaction to 2CL, the outputs F1 and F2 of FF change over once within the duration of a pulse from clock CL. F1 is connected to the "+" input of AD and F2 is connected to the "−" input of AD. Thus, within each pulse CL, the counter content of TR is successively added to and subtracted from the value "g": (g+0), (g−0), g+1, g−1, g+2, g−2, ... g+m, g−m. The procedure described below is performed for each of these values until the correct value of $s(t_2)$ is found. Before this procedure is elaborated, it is to be noted that in most systems it is known in which direction the displacement of the positioner will occur. In that case, the "+" input or the "−" input is directly activated from outside the device (for example, by a computer).

A result from AD, "g+i", arrives in the register 1 (left part of the drawing). The register 1 also receives (right part of the drawing) the value of the track number $s_m$ measured. This constitutes a complete track number for which it is yet to be determined whether it is the correct number. To this end, in subtractor 3 it is subtracted from an estimated value s' from 4. The absolute value of this difference (i.e. the sign is omitted) is compared with the value $s_g/2$ in comparison device 5. If a 1-signal occurs on VNOK, the result is not yet correct (the said absolute value is larger than $s_g/2$). Meanwhile, for example, "g+i−1" or ("g+i+1") is input into the register 1. Subsequently, the same is done with the content of the register 1 etc., until a 1-signal appears on the line VOK (said absolute value is smaller than $s_g/2$. This means that the result in register 1 is correct because the correct group number is then in AD or in the left part of the register 1. Under the control of the 1-signal on VOK the following takes place: the content of the register 1 is output, via the gate E3, to the environment (user) as the correct complete track number $s(t_2)$. At the same time, $s(t_2)$ is input in the register R1, the value $s(t_1)$ is transferred from R1 to R2. Furthermore, the new group number present in the left part of the register 1 is applied, via the gate E2, to the group register GR in order to replace the previous value.

The determination of the estimate is of major importance for this procedure. In FIG. 3, this is realized in the means 4 by means of said linear extrapolation. In this embodiment, this is realized as follows: the latest complete track number $s(t_1)$ is stored in the register R1. The content $s(t_1)$ of R1 is doubled (in this binary example, this can be simply realized by adding a bit "0" behind the least-significant bit: see indication Z in FIG. 3). In the subtractor SB, the subtraction takes place and the result g s'($t_2$), is stored in the register VRA where $s'(t_2) = 2 s(t_1) − s(t_0)$. The error of this estimate is maximum when the absolute value of the acceleration of the positioner is maximum. It can be calculated that this maximum error $\epsilon$, expressed in track numbers, is given by $\epsilon = a_m \cdot T^2/a$, in which $a_m$ is the maximum acceleration in m/sec$^2$. As has already been stated, the maximum error may not exceed $\frac{1}{2} s_g$ in an absolute sense. In all practical cases the estimate obtained by means of this extrapolation satisfies this requirement. Example: a system in which f=50 revolutions per second; a=85 μm; S=58; $s_g$=8; $v_m$=0.83 m/sec; $a_m$=70 m/sec.$^2$. The maximum number of groups m which can be traversed is m≧0.43≧m−1, so in practice m=1. The permissible estimate error is $\frac{1}{2} s_g$=4 track numbers. The maximum estimate error is $\epsilon$=0.1 track numbers. A further example: a disc memory comprising very narrow tracks and involving a small storage capacity loss due to comparatively few servo sectors; f=40 Hz; a=10 μm; S=50; $s_g$=32; $v_m$=2 m/sec; $a_m$=200 m/sec$^2$. The maximum number of groups m which can be traversed is then m≧3.1≧m−1, so in practice m=4. The maximum permissible error is $\frac{1}{2} s_g$=16 track numbers. The maximum error of the extrapolation amounts to $\beta$=5 track numbers, which is well within the acceptable limit.

It is to be noted that within the scope of the foregoing the mean speed between the passage of the last two servo sectors can be determined. This mean speed can be derived from the difference between the latest (i.e. last) and the last but one complete track number determined. The signal presenting this difference can in principle replace a speed transducer present in such disc memory systems. The speed signal thus obtained has a bandwidth which is limited by the sampling (only at the area of the servo sectors). If this bandwidth is insufficient for use in the control system of the memory, the signal can be increased by a second signal which represents only the high frequency fluctuations of the speed. U.S. Pat. No. 3,820,712 describes a method of generating such a high frequency signal, based on integration of the positioning current, and of forming a continuous speed signal.

Figure 4:
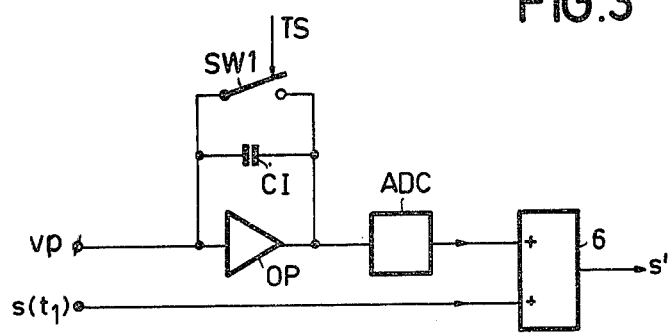
FIG. 4 shows a separate embodiment of means for estimating a complete track number.

FIG. 4 separately shows an embodiment of the fourth means for estimating a complete track number. When the memory system comprises a speed transducer (see FIG. 1), the speed $v_p$ can be integrated to form a position signal which is an estimate of the complete track number:

$$s'(t_2) = s(t_1 + \frac{1}{a} \cdot \int_{t_1}^{t_2} v(t)dt.$$

In the embodiment shown in FIG. 4, integration takes place in an integrator with an operational amplifier OP and an integration capacitor CI. The integration time is given by the pulse TS (see FIG. 1) which controls the switch SW$_1$. The integration result is converted, in an analog-to-digital converter ADC, into a binary value, after which the binary integration result is added, in an adder 6, to the value of the complete track number found one period $T (=t_2−t_1)$ earlier i.e. $s(t_1)$.

Figure 5:
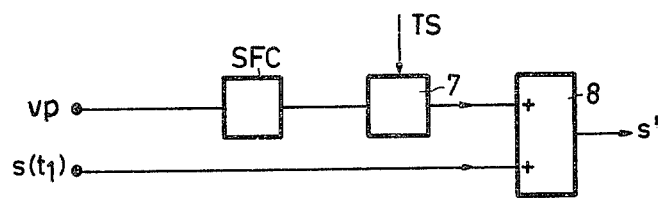
FIG. 5 shows a further separate embodiment of means for estimating a complete track number.

FIG. 5 separately shows a further embodiment of the fourth means for estimating a complete track number. The essential difference consists in that the integration of the speed signal $v_p$ takes place in a digital manner only after it has been converted into pulses in a voltage/frequency converter SFC. During periods T these pulses are counted in a counter 7 and are applied to an adder 8. Then:

$$s(t_2) = s(t_1) + \frac{v(t_1)}{a} \cdot T.$$

This is actually a refinement of the extrapolation method used in the embodiment of the means 4 described with reference to FIG. 3. As has already been noted, a refinement of this kind will not always be necessary, because the error remains substantially within the permissible limits during extrapolation.

Figure 6:
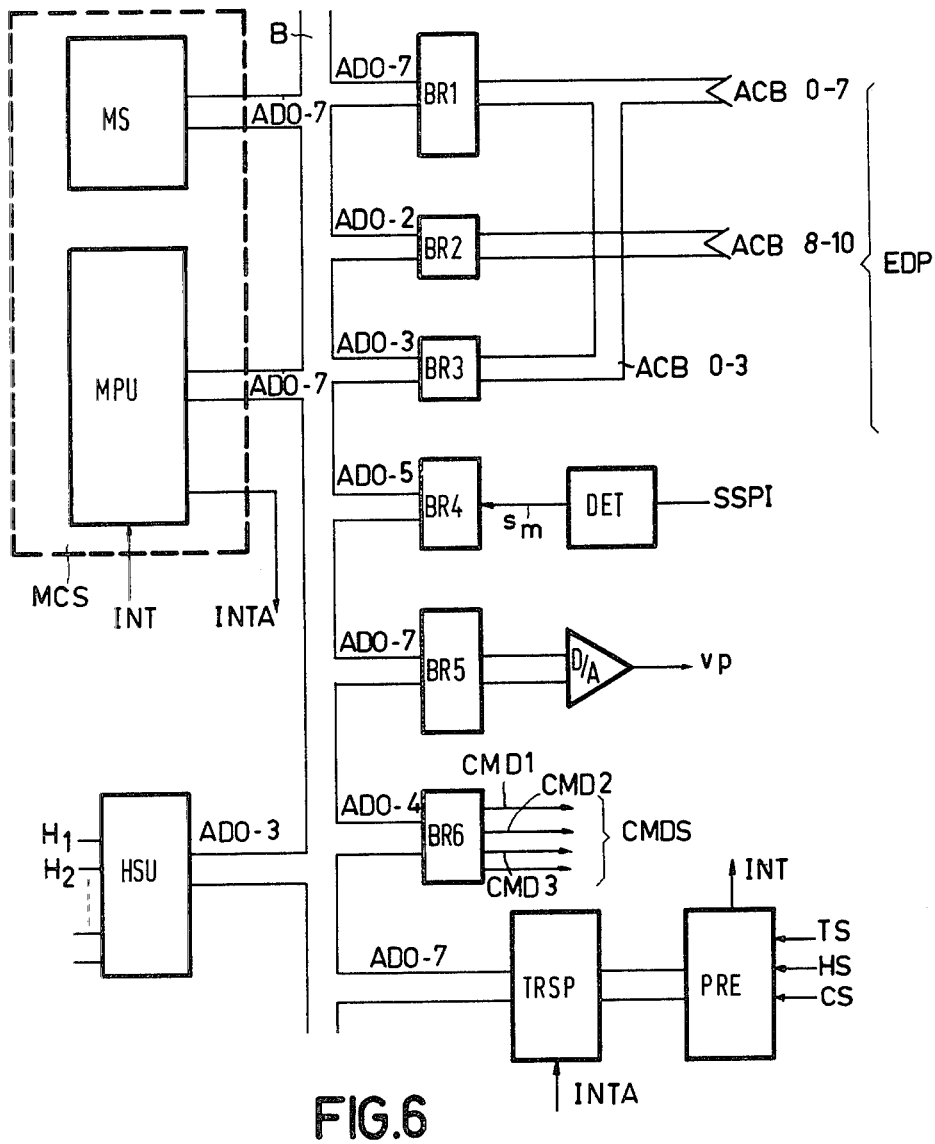
FIG. 6 shows a device comprising a programmed digital signal processor.

FIG. 6 shows a device comprising a programmed digital signal processor which is denoted by the reference MPU. In this example, MPU is a microprocessor (for example, of the type Intel 8085) which forms a so-called microcomputer system MCS in conjunction with the memory system MS. The system bus B connects the microprocessor MPU and the memory system MS via the lines AD 0-7 as well as the registers BR1, BR2, ... BR6, HSU and the gate TRSP. The registers BR1, BR2 and BR3 serve to transfer data from an electronic data processing system EDP (not shown), of which the device in accordance with this application forms a subunit, to the microcomputer system MCS. This data is the following: in reaction to a command CS, causing an interrupt in the system MCS (see hereinafter), the data concerning a desired target track number $s_d$ is present on the inputs ACB 0-10. Because the width of the bus B is only 8 bits in this example, 11 target track number bits (on ACB 0-10) are entered into the system MCS in two operations in this embodiment. This means that in a first cycle the first 8 bits are transferred from the inputs ACB 0-7, via the register BR1, to the bus B (lines AD 0-7) and are applied to MCS. The same is done in a second cycle for the remaining 3 bits on the inputs ACB 8-10 which are applied, via register BR2 and bus B (lines AD0-2), to MCS. For a complete understanding, this FIG. 6 also shows how, in the case of a disc memory, not only the target track number $s_d$ but also the desired head number is input from the EDP system. A command HS, causing an interrupt in the MCS system, indicates that the desired head number is present on the inputs ACB 0-3. In a "fetching" cycle generated by MSC for this purpose, the head number is input into the MSC system via the register BR3 and the lines AD 0-3. The head selection can thus be realized.

Further data to be input, obviously, is the data originating from the record carrier of the disc memory, notably the servo sector data: SSPI (see FIG. 1) during the passage of a servo sector along a head (instant TS). At TS, another interrupt occurs in MCS to indicate that the servo sector data is available. SSPI supplies the measured track number $s_m$ via DET (see FIG. 1). This number is stored in the register BR4. In practice this takes place twice and since $s_g = 8$, so needing 3 bits, BR4 is at least a 6-bit register, so that the same $s_m$ or, in the case of a rounding situation, possibly two different $s_m$ values are stored. Via lines AD 0-5, the $s_m$ data is transferred to the MCS system via the bus B by means of a fetching cycle. On the basis of all said data, the programmed digital signal processor (MPU) is capable of supplying the necessary control signals for the positioning apparatus PA and hence for the positioner P. In this embodiment, these control signals for PA (or P) are (see FIG. 1): vp, which is the positioning speed control signal, and some commands CMDS. On the basis of the difference determined between the target track number $s_d$ and the complete track number s obtained in the MPU (see hereinafter), the MPU determines the speed to be reached by the positioner P in order to reach the desired position in the shortest period of time. The relationship between the distance yet to be covered (in track numbers) and the speed is stored for this purpose in a suitable memory section and this data is applied to output register BR5 via the bus B (lines AD 0-7). The control signal vp then occurs after digital-to-analog conversion in D/A. If the difference between $s_d$ and s is large enough (for example, more than 1 track number), coarse control is concerned. This situation is made known to PR by way of a relevant command CMD1 which is applied from MPU to the register BR6. In the case of fine control, a command CMD2 is present on a relevant output of BR6. Depending on the direction in which the positioner must be positioned (determined by the sign of the difference between $s_d$ and s), a further command CMD3 will have a given value. In practice more commands CMDS will be available (for example, even/odd track), but these commands are not of importance for a proper understanding of the present invention and will not be elaborated herein. The same is applicable to the head selection: on the basis of the head number input (see above) and a track number reached, the processor MPU applies this head number, via the bus B (lines AD 0-3), to the head selection unit HSU. The various heads H1, H2, . . . can thus be selected.

As regards the above interrupts requested by the signals CS, HS and TS, the following explanation can be given. The interrupt requests CS, HS and TS are applied to inputs of a priority encoder PRE. In reaction to a request, an output INT provides a signal which is applied to MPU. When the interrupt request is accepted, MPU supplies a signal on output INTA. The interrupt having the highest priority of all interrupts requested is granted priority (in this case, TS always has the highest priority). In reaction to the signal INTA, the interrupt released by PRE and coded in a number is applied, via a tri-state buffer gate TRSP and the bus B, to MCS which reacts by starting an associated instruction (so-termed RESTART instruction).

Figure 7A:
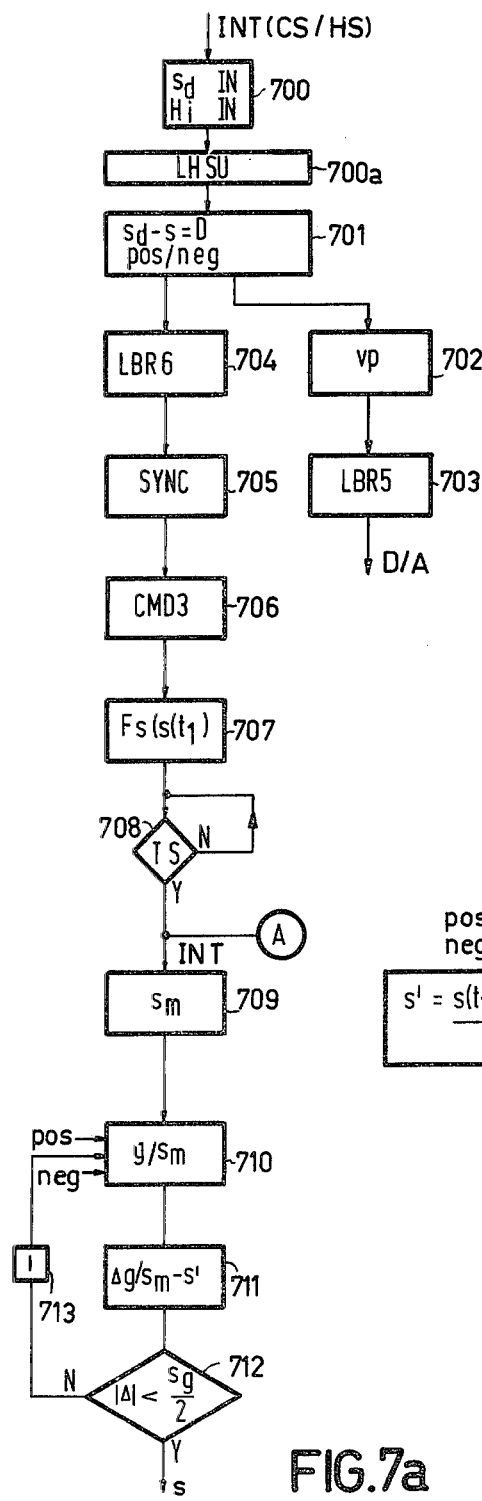
FIGS. 7a and 7b show flow diagrams concerning the operation of the device comprising a programmed digital signal processor.

The operation of the system shown in FIG. 6 is illustrated on the basis of flow diagrams in FIGS. 7a and b.

On the basis of the interrupt commands INT (CS/HS), the data of the EDP system (see FIG. 6) concerning the desired target track number $s_d$ and the head number Hi are input in the system MCS: $s_d$IN and HiIN. In block 700a, it is indicated that the head selection unit HSU is loaded: LHSU. In block 701 it is indicated that in MCS the difference is determined between the desired $s_d$ and a previously determined actual (or possibly starting position) track number: $D = s_d - s$. This difference may be positive or negative. The latter data is input in register BR6: LBR6 (block 704). The command CMD3 is thus laid down. The magnitude of the difference D is used in block 702 for determining the speed vp at which the positioner is to be controlled (see the description with reference to FIG. 6). The digital value of vp is loaded into the register RB5: LBR5 (block 703). The positioner can be controlled therefrom via the D/A conversion. In block 705 it is determined whether synchronization with the sector pulses exists: it is thus ensured that the processing of the data in the programmed digital signal processor takes place in the correct periods of time, so that the results of the processing are applied at the correct instants in the positioning process. If the synchronization is correct, the command CMD3 from register BR6 to the positioning control apparatus (PA in FIG. 1) is released (block 706).

The determination of the track number in the MCS system commences at this instant. Block 707 Fs indicates that the latest (last determined) complete track number s (= $s(t_1)$) is prepared for use. (The s-value is normally stored in the table of a memory section). Block 708 provides a delay conditional on whether a servo sector pulse TS appears. If not, "N", there is a delay. If yes, "Y", the process may proceed to block 709. Said yes means that there are servo signals i.e. SSPI is present (FIGS. 1 and 6). Therefrom, a measured track number $s_m$ is derived (DET) and is stored in the register BR4 and applied to the MSC system. Subsequently, block 710 is reached. Therein, the (variable) group number g in a group number register is combined with the value $s_m$ (compare FIG. 3, register GR and 1). In block 711, the difference $\Delta = g/s_m - s'$ is determined. (s' is again available from the last processing cycle thereof). In block 712, it is checked whether the magnitude, $|\Delta|$, of said difference $\Delta$ is less than $s_g/2$. If not, "N", the group number value is increased or decreased by 1 in block 713 (depending on whether a positive or a negative direction displacement is concerned, determined by the command CMD3). In this respect, also compare the operation according to FIG. 3, element 5 etc. If $|\Delta| < s_g/2$, "Y" occurs which means that the result of the combination of g and $s_m$ is ready for further treatment. The result of the combination of $g/s_m$ is indicated by s which is the complete track number found on the basis of the latest measured value of $s_m$. The estimated value s' used for this purpose is the result of an estimate calculation made on the basis of measuring data obtained directly previously, notably the last value $s=s(t_1)$ determined as indicated at the top of FIG. 7b.

Figure 7B:
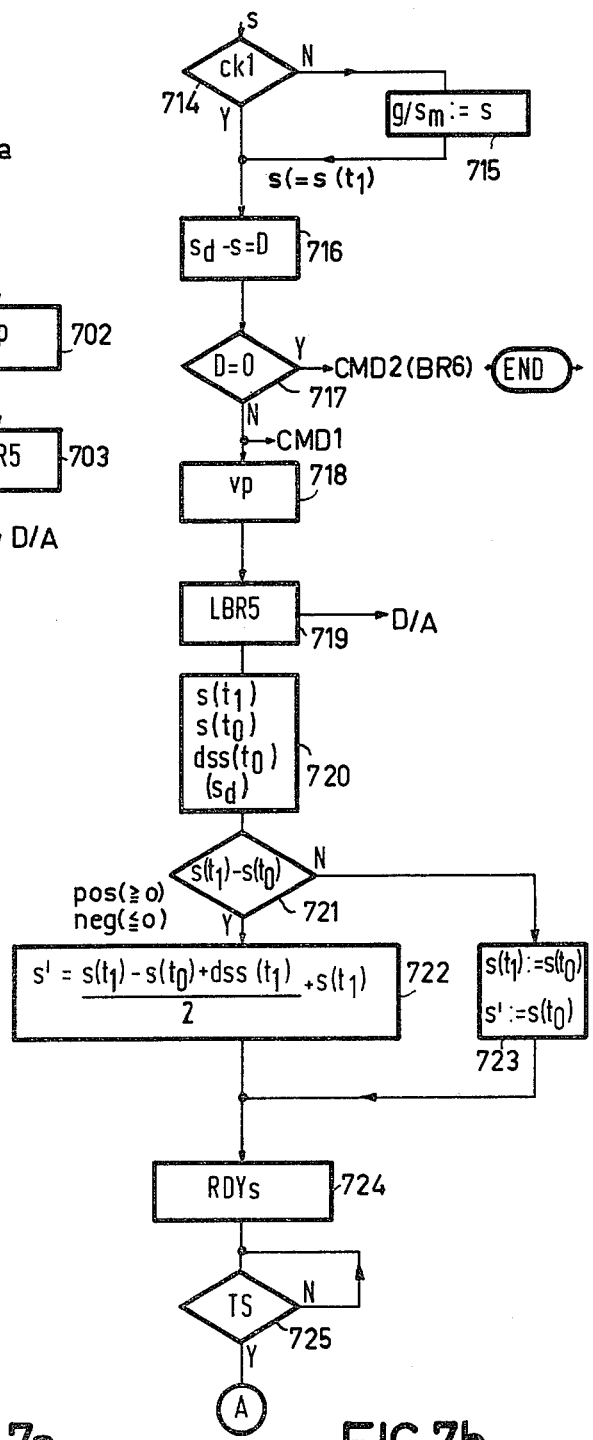

In FIG. 7b, a check "ck1" is performed in block 714 in order to check whether the result obtained satisfies given requirements: the complete track number may not exceed a given maximum (because there are only a given number of tracks). If this check reveals an error, "N", block 715 becomes relevant. Therein, the value $s=g/s_m$ is simply replaced by a value of s found during the preceding measurement (the rejected latest measurement is thus neglected). If the check is O.K, "Y", block 716 is reached. For each latest determined value of the complete track number s ($=s(t_1)$), the difference $D=s_d-s$ is determined in block 716. If $D=0$, the target track has been reached, "Y", the command CMD2 appears and is stored in BR6. Fine control is then initiated, and the processing of the positioning data is terminated at "END". If D is not yet zero ("N"), the process continues normally, beginning with a coarse control command CMD1. Block 718 shows the speed indication vp which is loaded from the MCS into the register BR5 (LDR5) as a speed control signal, block 719. Therefrom, after D/A conversion, it is applied to the positioning apparatus PA. A table of the memory MCS inter alia stores $s(t_1)$, but also the preceding value $s(t_0)$ and also the difference between this preceding value and the preceding value but one, that is, dss ($t_0$) of the complete track numbers. This is shown in block 720 (for completeness' sake, the target track number is also indicated therein). In block 711, a further check is performed: the difference between the latest complete track number (in this case $s(t_1)$) and the preceding one (in this case $s(t_0)$) must be larger than or at least equal to 0 for "forward" displacement, that is to say positive displacement, (compare block 701 above). If "backward" (negative) displacement takes place, this difference must be smaller or a least equal to 0. If this check is O.K., "Y" block 722 is reached. If this check is not O.K., "N", a read error has occurred, for example, due to an oscillation. The system comprising the signal processor can thus simply discover such an error and it can even intervene: block 723. In block 723 the preceding situation is returned to for the sake of reliability, i.e. the value $s(t_1)$ is replaced by $s=s(t_0)$ (the result of the preceding measurement). Moreover, in block 723 the value $s=s(t_0)$ is also taken as the estimated value s'. This value can be used for further processing and the error is automatically corrected when a (the) next measurement (via 724 etc.) is performed. If the check in block 721 was O.K., "Y", the estimated value s' is determined in block 722 by means of data from block 720 by extrapolation:

$$s' = \frac{s(t_1) - s(t_0) + dss(t_0)}{2} + s(t_1).$$

This means an extrapolation over a plurality of previous values of s or the differences thereof. This possibility is offered by the use of the programmed signal processor without a substantial number of additional facilities being required. After the calculation of s' by extrapolation, block 724 is reached. In block 724, RDYs indicate that the data then available is ready for further processing. A next servo pulse TS is awaited: block 725 (compare the situation in block 708). If TS appears ("Y"), the process continues at point A of FIG. 7a.

Figure 8:
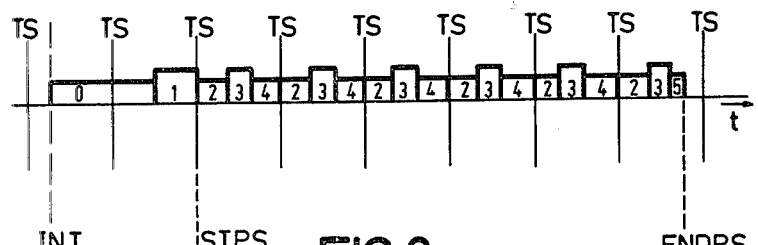
FIG. 8 shows a time diagram.

FIG. 8 illustrates the processing in the time described with reference to the FIGS. 7a and 7b. Along the time axis t, the instants TS are indicated as vertical strokes. At INT, the interrupt from CS appears, HS with statement of the newly desired head number and the target track number. At STPS, the positioning starts, the estimated value being equal to the present track number (the speed is still zero). ENDPS indicates the instant at which the positioning is terminated. In this segment, the processing phases 0 to 5 are completed. The phases, 2, 3, 4 thereof are completed as many times as is required for reaching the target track. The said phases can be found in the FIGS. 7a and 7b as follows:

phase 0: processing of new head number and target track number: blocks 700 to 707.

phase 1: waiting cycle for synchronization: block 708.

phase 2: reading from servo sector and forming of new track number: blocks 709 to 715.

phase 3: determination of the difference between the target track number and the new track number and thus the speed and D/A value for positioner PA: blocks 716 to 719.

phase 4: determination of new estimate s' and waiting for next TS: blocks 720 to 725.

phase 5: switching over to fine control, end of positioning: from Y output of block 717.

What is claimed is:

1. A device for recovering a storage track number of a storage track present on a disc-shaped and rotatable record carrier, said storage track being aligned with a transducer device provided on a positioning member for being cross-track positionable, wherein the record carrier comprises a first plurality of groups of storage tracks being divided into alternate data tracks and servo tracks, the record carrier thereby being divided into alternate sectors of data tracks (DS) and servo tracks (SS), and wherein each servo track comprises the in-group number of the associated storage track within its grup of storage tracks, said device comprising:

indicator means (1) for indicating a validated complete storage track number composed of an in-group storage track number and a group number; read means (SW) connected to said transducer device for, upon encountering a servo track, reading the in-group storage track number (SM) therefrom, said read means having an output connected to said indicator means, for thereto forwarding a preliminary in-group storage track number as read most recently;

synchronizer means (PV) for, upon said transducer device encountering a servo track, generating a synchronizing signal (TS);

estimating means (4) connected to an output of said indicator means for, under control of a synchronizing signal from said synchronizer means while determining a cross-track speed attained by said transducer device between successive encounters with two servo sectors, generating an estimated complete storage track number by extrapolating the validated complete storage track number with said cross-track speed, generator means (1) for, under control of a synchronizing signal, generating a sequence of at least one preliminary group number and having an output connected to said indicator means for thereto forwarding a preliminary group number as generated most recently thereby, difference determining means (3) connected to an output of said indicator means and to an output of said estimating means for determining the difference between an estimated complete storage track number and a preliminary group number and a preliminary in-group storage track number;

comparator means (5) connected to an output of said difference determining means for comparing said difference with a quantity equal to half said second plurality and for, under control of a smaller difference, generating a validating signal (VOK) to said indicator means with a stop signal to said generator means, but under control of a larger difference generating a proceed signal (VNOK) to said generator means, for generating at least one further preliminary group number.

2. A device a claimed in claim 1, wherein the estimating means comprises a cross-track speed determining means coupled to said positioning member (PA), the cross-track speed signal, via an integrator (OP/CI), an analog to digital converter (ADC) being applied to a first input of an adder (6), while the second input of the adder is connected to an output of the indicator means for generating an estimated compete storage track number by adding.

3. A device as claimed in claim 1, wherein the estimating means comprise a cross-track speed determining means coupled to said positioning member (PA), the cross-track speed signal, via a voltage to frequency converter (SFC) and a counter (7) being applied to a first input of an adder (8), while the second input of the adder is connected to an output of the indicator means for generating an estimated complete storage track number by adding.

4. A device as claimed in claim 1, wherein the estimating means comprise register means connected to an output of the indicator means for receiving therefrom a most recently validated complete storage track number and subtracting means for, by doubling the most recently received complete storage track number and subtracting therefrom the last preceding complete storage track number, generating an estimated complete storage track number.

5. A device as claimed in claim 1, wherein a programmed digital signal processor is provided having arithmetic and logical means for executing said estimating, generating, difference determining and comparator means functions and a plurality of registers for functioning as said indicator means, and for storing a preliminary group number and preliminary in-group storage track number.

6. A device a claimed in claim 5, wherein said digital signal processor executes the estimating over at least two most recently validated complete track numbers.

7. A device as claimed in claim 6, wherein said digital signal processor executes the estimating over at least three most recently validated complete track numbers.

8. A device as claimed in claim 5, wherein the programmed digital signal is adapted to determine a difference between a desired destination track number and a validated complete storage track number.

* * * * *